United States Patent [19]

Formigoni

[11] Patent Number: 5,196,823
[45] Date of Patent: Mar. 23, 1993

[54] DERATIZATION APPARATUS WITH REMOTE TERMINALS

[75] Inventor: Michele Formigoni, Padua, Italy

[73] Assignee: Multitecno S.p.A., Padua, Italy

[21] Appl. No.: 338,813

[22] Filed: Apr. 17, 1989

Related U.S. Application Data

[63] Continuation-in-part of Ser. No. 214,809, Jul. 5, 1988, abandoned, which is a continuation of Ser. No. 38,860, Apr. 15, 1987, abandoned.

[30] Foreign Application Priority Data

Apr. 24, 1986 [IT] Italy .................... 41559 A/86

[51] Int. Cl.⁵ ............... H04M 11/04; A01M 5/04
[52] U.S. Cl. ................... 340/310 R; 340/310 A; 340/310 CP; 340/573; 119/156; 43/124; 43/143
[58] Field of Search ........ 340/310 R, 310 A, 310 CP, 340/573, 582; 119/156; 43/124, 132.1, 143

[56] References Cited

U.S. PATENT DOCUMENTS

| | | | |
|---|---|---|---|
| 3,657,715 | 4/1972 | Curtia | 340/310 CP |
| 4,040,046 | 8/1977 | Long et al. | 340/310 CP |
| 4,365,238 | 12/1982 | Kollin | 340/310 CP |
| 4,410,883 | 10/1983 | Swiston, Sr. | 340/310 CP |
| 4,446,458 | 5/1984 | Cook | 340/310 CP |

Primary Examiner—Donnie L. Crosland
Attorney, Agent, or Firm—Guido Modiano; Albert Josif

[57] ABSTRACT

A deratization system includes a plurality of remote terminals provided with vibrating apparatus, the remote terminals being controlled by a central transmitting unit. High frequency signals generated by the central transmitting unit are sent through the existing electrical net of a building to the remote terminals using the technique of simultaneously conveyed frequencies. A signal energizes all terminals or just a number of preselected terminals. In turn the remote terminals are sending in case of malfunction an error signal to the central transmitting unit.

14 Claims, 3 Drawing Sheets

DERATIZATION APPARATUS WITH REMOTE TERMINALS

This is a continuation-in-part of U.S. Ser. No. 07/214,809, filed on Jul. 5, 1988, now abandoned, which in turn is a continuation of U.S. Ser. No. 07/038,860 filed Apr. 15, 1987 now abandoned.

BACKGROUND OF THE INVENTION

The present invention relates to a deratization apparatus with remote terminals, more specifically to a deratization central unit controlling several remote terminals provided with vibration generating means.

Several deratization devices are currently in use among one can list devices provided with sound generating means. Such an installation as disclosed by the European Patent EP-A1-0 042 644 provides for an electronic central control unit, said unit modulating a control signal which is being wired to several remote terminals, said remote terminals including means to generate a signal of a frequency according to the incoming control signal.

As the experiments in the field of deratization had shown that rats are sensitive to low frequency signals, said means are generating a signal in the range of 50 Hz. However further experiments had shown that better results are achieved by varying the frequency and the amplitude of the generated signals. Therefore the central control unit is generating, according to a preset logic, signal series having variable frequencies and amplitudes. Said signal series are conveyed to the remote terminal through electrical wires and actuate a ferromagnetic mass to vibrate, the latter being mechanically connected to the building to be deratized. Thus a "micro-seism" stressing the rats is generated, the low frequency vibrations driving thus rats away.

Although the deratization device mentioned hereinabove has proved to be very effective in driving off the rats, the provision of wiring in large buildings from the central unit to the remote terminals is technically difficult, time-extensive and costly. In fact, as the deratization problem occurs mostly in old buildings, where there is just an electrical power supply net and no other wiring, separate conductors are needed to connect the central unit to said remote terminals, said separate conductors carrying the control signal modulated by said central unit.

Further, the deratization device described hereinabove has also proved to be not flexible enough, as there is no way of controlling independently the working status of each remote terminal.

SUMMARY OF THE INVENTION

Therefore it is an object of the present invention to provide an apparatus for deratization which can be installed without the technical problems of the known systems.

More specifically, an object of the present invention is to provide a deratization device comprising a central unit connected by simple and inexpensive means to a plurality of remote terminals.

Another object of the present invention is to provide a deratization device with a central unit able to control a great number of remote terminals no matter how said remote terminals are installed in the building to be deratized.

Still another object of the present invention is to provide a deratization device with a central unit able to control the working status of the remote terminals.

Not least object of the present invention is to provide a deratization unit with a central unit able to check the functioning of the remote terminals.

The above outlined objects and others to become apparent hereinafter, are achieved by an apparatus for deratization such as defined in the accompanying claims.

BRIEF DESCRIPTION OF THE INVENTION

Further features and advantages will be more apparent from the detailed description of a deratization apparatus, with reference to the accompanying, non-limitative drawings, wherein.

DESCRIPTION OF THE PREFERRED EMBODIMENTS

Figure 1:
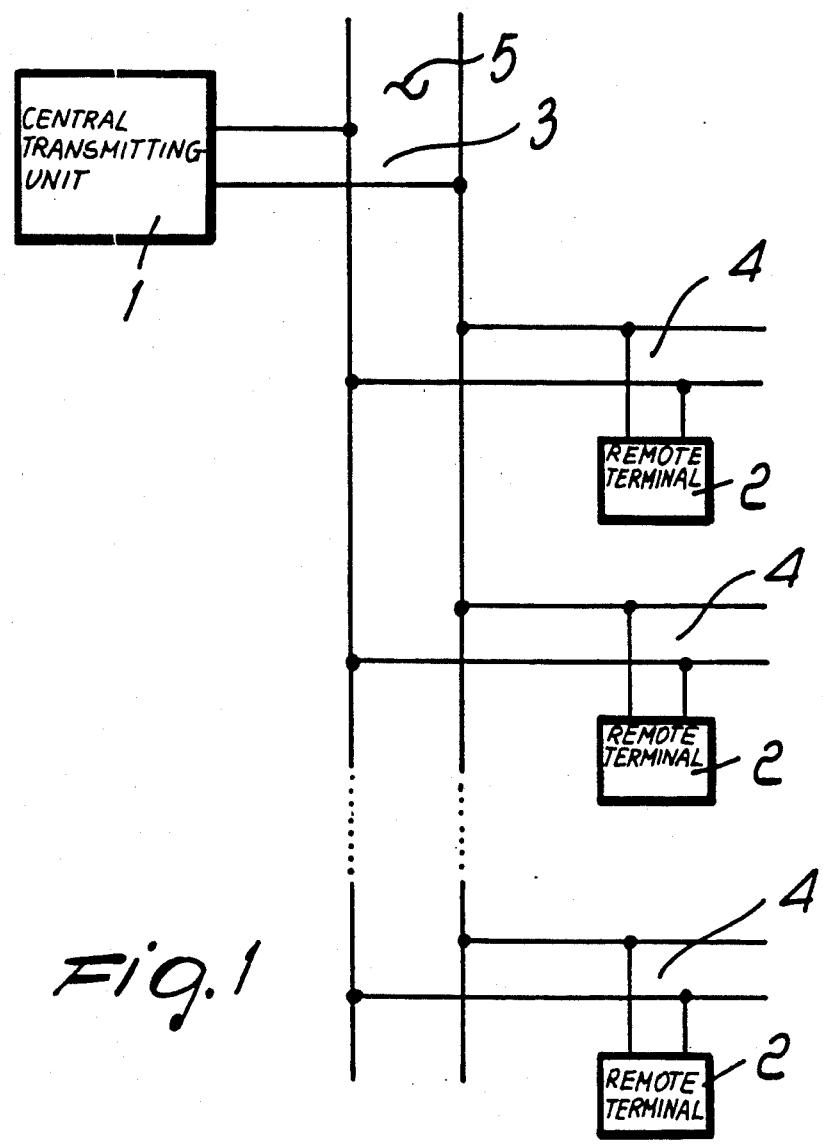
FIG. 1 is a schematic overall view of the deratization apparatus with a central transmitting unit and several remote terminals.

With reference to the above cited figures, the device for deratization comprises a central transmitting unit designated by the numeral 1 and a plurality of remote terminals designated by 2. The connection between the central transmitting unit 1 and the remote terminals 2 is made through the electric power supply net 5 of the building to be deratized, with a feeding connection of the central transmitting unit to said net being designated by the numeral 3 and a further feeding connection of said remote terminals to said net being designated by the numeral 4.

Figure 4:
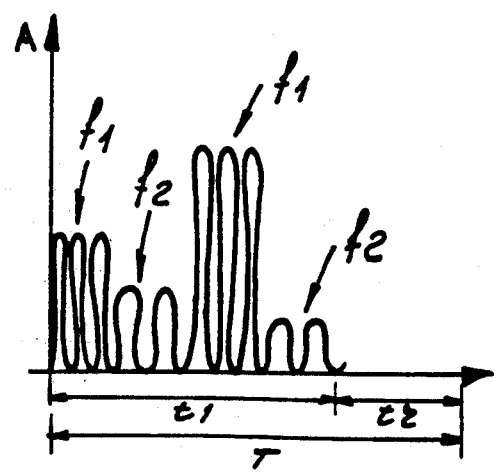
FIG. 4 is a graph showing a possible control signal such as generated by said central transmitting unit before being modulated.
Figure 2:
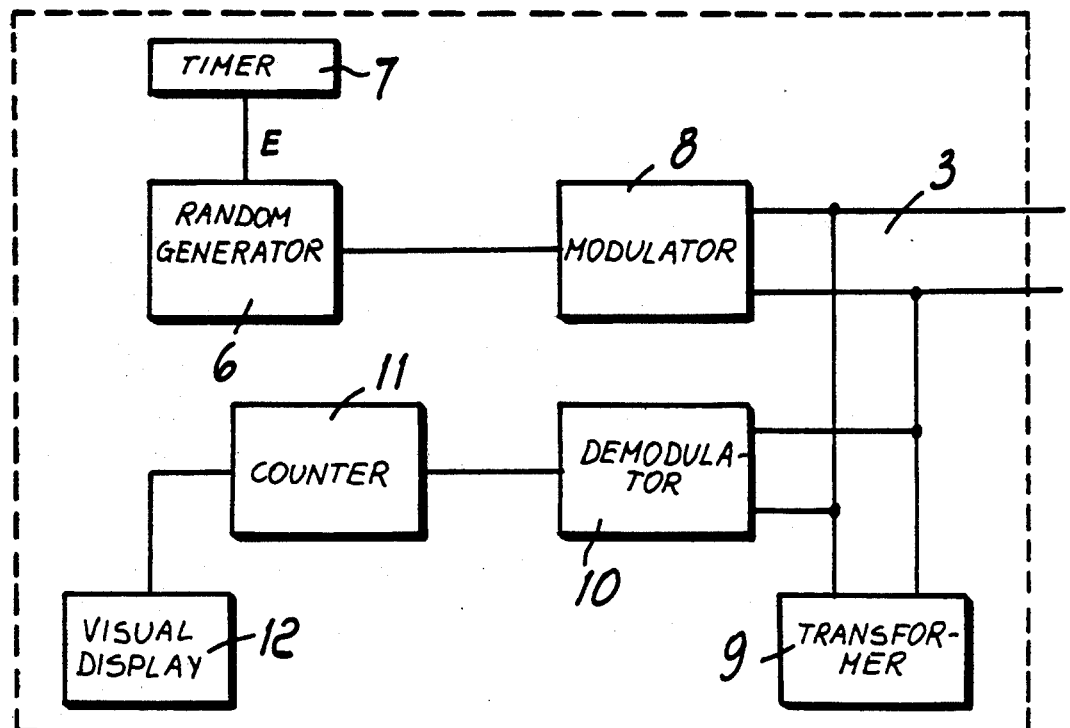
FIG. 2 is the block diagram of a central transmitting unit in a first embodiment.

In a first embodiment, the central transmitting unit comprises random generator means designated by the numeral 6. The random generator means are of conventional design, being adapted to generate signals having at least two different frequencies and having different amplitudes such as shown in FIG. 4. Timer means 7 are provided in said central transmitting unit to control through an enable input E the random generator means. Signals are generated in cycles having the length T. The timer means are adapted (through user controlled means not shown) to set the length t1 of the active phase of the signal and respectively the length t2 of the disable phase as shown in FIG. 4.

Downstream with respect to said random generator means, there is a modulator 8 adapted to modulate the incoming frequency signals and send said signals through the feeding connection 3 into the net 5.

Also connected to said feeding connection 3 is a transformer 9 powering the components of the central transmitting unit, and a demodulator 10. Further upstream of said demodulator there is a counter 11 controlling visual display means 12.

Figure 3:
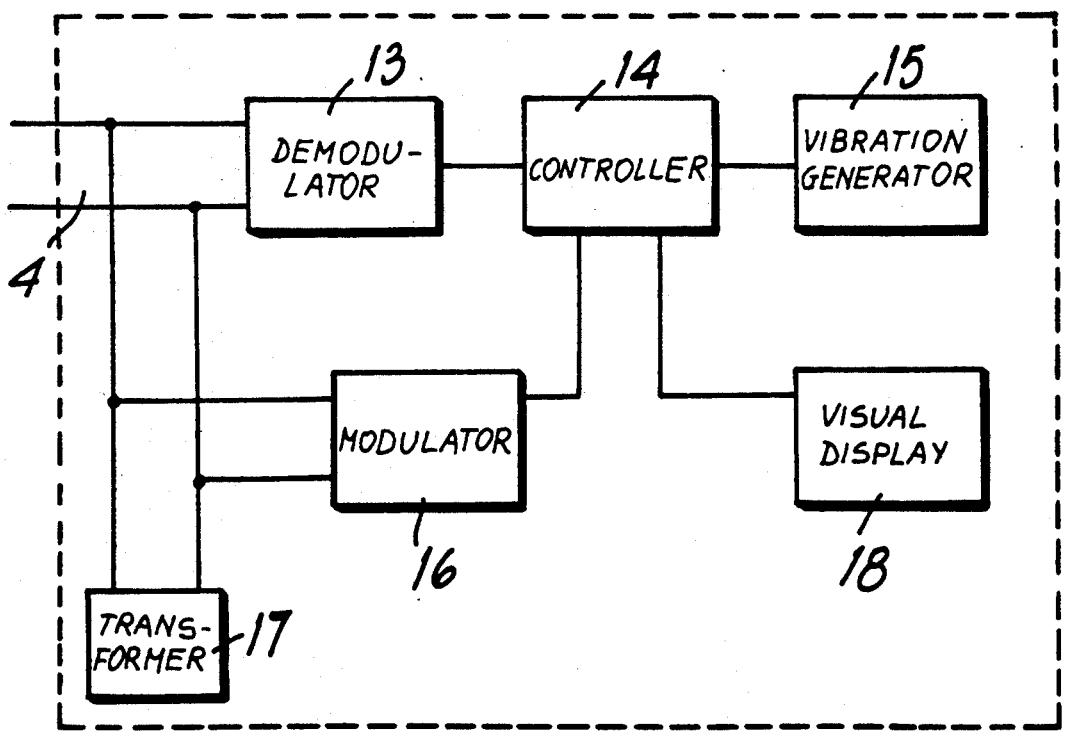
FIG. 3 is the block diagram of one remote terminal corresponding to said first embodiment.

Corresponding to the above first embodiment of the central transmitting unit there are the remote terminals 2. As shown in FIG. 3 the remote terminal comprises a remote terminal demodulator 13 connected through said further feeding connection 4 to the net 5. The demodulator is sending the demodulated signals to a remote terminal controller 14, the latter actuating vibration generating means 15 if the demodulated signal is not nil. The remote terminal controller is monitoring the functioning of the remote terminal and in case of malfunction generating through a remote terminal modulator 16 an error signal. The error signal is generated during the disable phase t2 and is picked up by the central transmitting unit. The remote terminal modulator is connected to the further feeding connection 4 to the net 5. The remote terminal comprises further a transformer module 17 adapted to power the components of said remote terminal. Finally visual display means 18 are provided to the remote terminal to display upon error condition (recognized by the controller 14) a luminous signal.

The operation of the device according to the invention is as following.

After (user actuated) setting the length t1 of the active phase time, the random generator means are generating a signal which is being modulated by the modulator 8 and sent into the net 5 using the technique of simultaneously conveyed frequencies, that is making use of the electrical net 5 to send both an alternating voltage (of 50 or 60 Hz) and the high frequency modulated signal. The modulated signal is then demodulated in the remote terminals, actuating the vibration generating means. On error condition in the remote terminal, the controller 14 generates an error signal which is sent again through the net 5 and is picked up by the central transmitting unit during the disable phase t2. The error signal is demodulated in the central transmitting unit and sent to the counter 11 which is thus counting during each cycle the number of malfunctioning remote terminals. This number and its complementary (i.e. the number of functioning terminals) is the displayed by the means 12.

Of course the device according to the invention may be modified or adapted in various ways without departing however, from the purview of the instant inventive concept.

Figure 5:
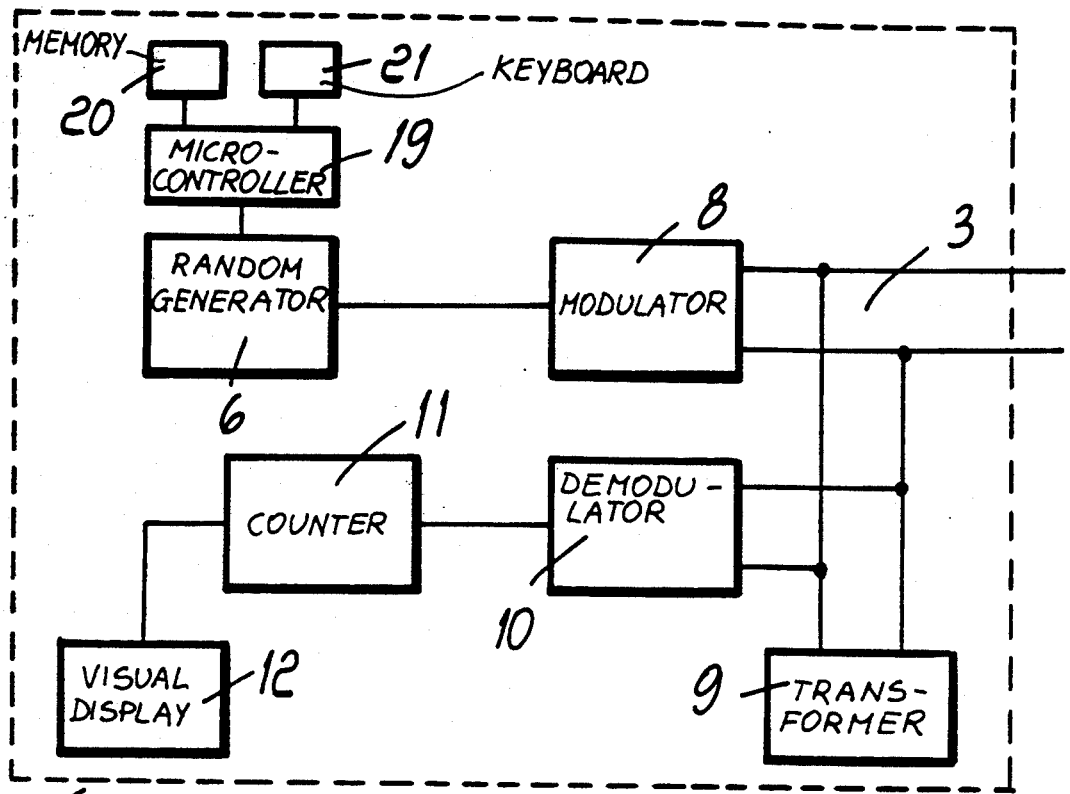
FIG. 5 is the block diagram of a central transmitting unit in a second embodiment.

For example such as shown in FIG. 5 the timer 7 can be replaced by a microcontroller 19 of conventional type provided with a memory 20 enabling the user to store at several programs. In this embodiment a first program is enabling the user to selectively define, through an input (for example a conventional keyboard 21) the number of working remote terminals. Thus the user can select the address of the working remote terminal. The microcontroller can also be adapted to control the enable input E of the random generator setting thus the length of the active phase t1.

Figure 6:
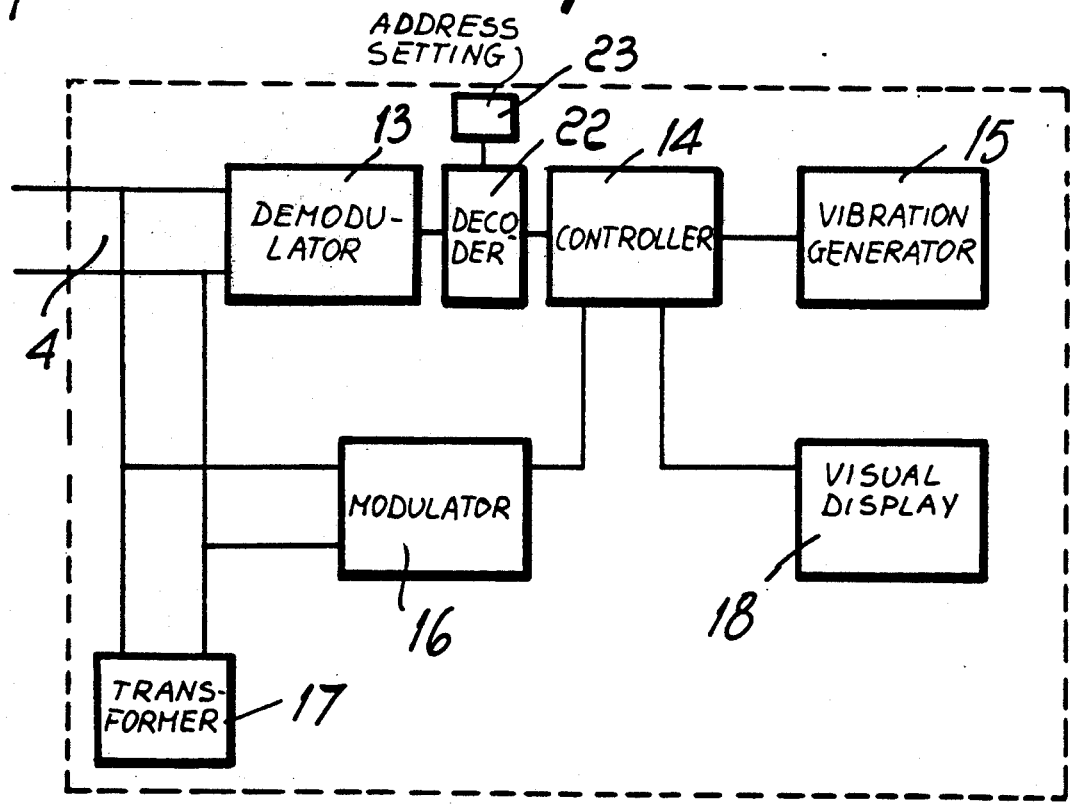
FIG. 6 is the block diagram of one remote terminal corresponding to said second embodiment.

In the above embodiment, such as shown in FIG. 6, address setting means 23 and decoding means 22 are provided in the remote terminals 2 enabling the user to set an address to each said terminal. The remote terminal is just working when said decoding means 22 are recognizing a selected address.

In this way the central transmitting unit can enable a particular remote terminal during each cycle T. Consequently during that cycle only the preselected remote terminals will be activated.

Furthermore, in a not shown embodiment, the random generator means can be replaced by a frequency generator controlled by the microcontroller which drives said frequency generator according to a prestored logic.

Finally all details may be replaced with other technically equivalent ones.

I claim:

1. Deratization apparatus for use in buildings, the apparatus comprising a central transmitting unit and a plurality of remote terminals connected to the central transmitting unit through an electrical net,
    said central transmitting unit comprising first means adapted to generate a high frequency signal of variable frequency and length and to send the signal through said electrical net to said plurality of remote terminals,
    each remote terminal of said plurality of remote terminals comprising second means adapted to receive the high frequency signal and to actuate vibration generating means, said vibration generating means generating vibrations according to the high frequency signal received from said central transmitting unit, the remote terminals further comprising control means adapted to send through said electrical net an error signal to the central unit in case of malfunction.

2. Deratization apparatus according to claim 1, wherein said electric net is a power supply net already installed in the building.

3. Deratization apparatus according to claim 1, wherein said electric net is also powering each said remote terminal and the central transmitting unit.

4. Deratization apparatus according to claim 1, wherein said first means of the central transmitting unit include random generator means adapted to generate a signal having at least two different frequencies and different amplitudes, said random generator means being connected through modulator means to the electrical net, with said modulator means generating the high frequency signal in accordance to the signal incoming from the random generator means.

5. Deratization apparatus according to claim 4, wherein said central transmitting unit further includes timer means adapted to enable and respectively disable the random generator means.

6. Deratization apparatus according to claim 5, wherein said central transmitting unit further comprises demodulator means connected to the electrical net and adapted to receive during the disable of the random generator means the error signal, and counter means counting the number of malfunctioning remote terminals according to the received error signal, said counter means being coupled to display means to visualize a count representing the number of malfunctioning remote terminals.

7. Deratization apparatus according to claim 1, wherein said second means of each said remote terminal include remote terminal demodulator means connected upstream to the electrical net and downstream to remote terminal control means, said control means being adapted to actuate the vibration generating means and to send the error signal through a remote terminal modulator into the electrical net in case of malfunction of the remote terminal.

8. Deratization apparatus for use in buildings, the apparatus comprising a central transmitting unit and a plurality of remote terminals connected to the central transmitting unit through an electrical net, wherein said electric net is a power supply net already installed in the building, said central transmitting unit comprising first means adapted to generate a high frequency signal of variable frequency and length and to send the signal through said electrical net to said plurality of remote terminals, said first means comprising enable means adapted to select the number and address of the active remote terminals, each said remote terminal of said plurality comprising second means adapted to receive, if the remote terminal has been selected, the high frequency signal and to actuate vibration generating means, said vibration generating means generating vibrations according to the high frequency signal received from said central transmitting unit, the remote terminals further comprising control means adapted to send through said electrical net an error signal to the central unit in case of malfunction.

9. Deratization apparatus according to claim 8, wherein said first means of the central transmitting unit include random generator means adapted to generate a signal having at least two different frequencies and different amplitudes, said random generator means being connected through modulator means to the electrical net.

10. Deratization apparatus according to claim 9, wherein microcontroller means associated to a memory are provided to the central transmitting unit, enabling it to set the address and number of the active remote terminals according to a stored sequential logic, said microcontroller being adapted to disable or enable the random generator means according to said logic.

11. Deratization apparatus according to claim 8, wherein said central transmitting unit further comprises demodulator means connected to the electrical net and adapted to receive during the disable of the random generator means the error signal, and counter means counting the number of malfunctioning remote terminals according to the received error signal, said counter means being coupled to display means to visualize a count representing the number of malfunctioning remote terminals.

12. Deratization apparatus according to claim 8, wherein said second means of each said remote terminal include remote terminal demodulator means connected upstream to the electrical net and downstream to remote terminal control means, said control means including address decoding means, and being adapted to actuate the vibration generating means, if the remote terminals address is recognized.

13. Deratization apparatus according to claim 12, wherein means are provided to set the address of the remote terminals.

14. Deratization apparatus according to claim 8, wherein the remote terminal controller is adapted, in case of malfunction of the remote terminal, to send the error signal through a remote terminal modulator into the electrical net.

* * * * *